United States Patent [19]

Mercier

[11] 4,173,776
[45] Nov. 6, 1979

[54] POWER CAPACITOR WITH AN INTERNAL SUPPORT STRUCTURE

[75] Inventor: George E. Mercier, Bloomington, Ind.

[73] Assignee: Westinghouse Electric Corp., Pittsburgh, Pa.

[21] Appl. No.: 831,622

[22] Filed: Sep. 8, 1977

[51] Int. Cl.² .............................................. H01G 1/02
[52] U.S. Cl. .................................. 361/272; 361/274; 361/314
[58] Field of Search ............... 361/272, 274, 275, 327, 361/314, 328, 329, 1; 174/17 LF

[56] References Cited

U.S. PATENT DOCUMENTS

| 1,794,289 | 2/1931 | Haefely | 361/272 X |
| 1,920,177 | 8/1933 | Bailey | 361/272 X |
| 1,991,707 | 2/1935 | Silbermann | 361/329 |
| 3,098,956 | 7/1963 | Hammer | 361/329 |
| 3,441,816 | 4/1969 | Butrico | 361/329 X |
| 3,600,636 | 8/1971 | Peterson | 361/282 |
| 3,634,798 | 1/1972 | Astleford | 336/92 |

Primary Examiner—E. A. Goldberg
Attorney, Agent, or Firm—J. W. Keen

[57] ABSTRACT

A cradle structure situated within and fastened to a capacitor containment casing for supporting an electrical assembly disposed within that casing. The cradle structure is attached to either the containment casing's side walls or its cover.

5 Claims, 1 Drawing Figure

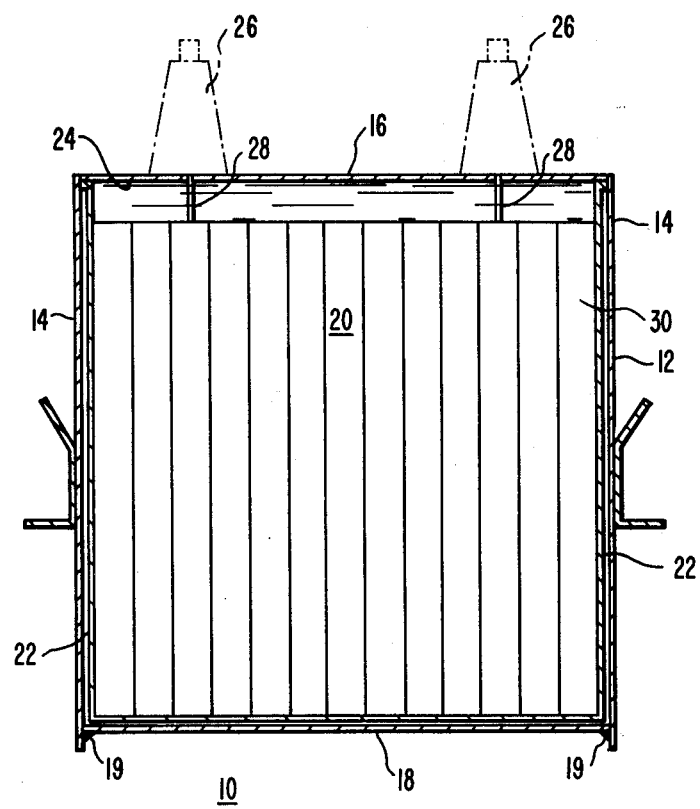

POWER CAPACITOR WITH AN INTERNAL SUPPORT STRUCTURE

BACKGROUND OF THE INVENTION

1. Field of the Invention

This invention relates to power capacitors and more particularly to means for retaining the capacitor's internals within its containment casing after rupture of the casing.

2. Description of the Prior Art

For more than 40 years polychlorinated biphenyl has been used as an impregnating fluid in power capacitors. In relatively recent years polychlorinated biphenyls were found to be environmentally undesirable in that their biodegradation rate was very slow and they tended to bioaccumulate in the environment, but especially in the fatty tissues of fish and mammals. After an exhaustive search for an acceptable replacement fluid for the polychlorinated biphenyls, isopropyl biphenyl fluid was found to have properties very similar to the polychlorinated biphenyls and was thus chosen for feature use in power capacitors manufactured by the assignee of the present invention.

Althoughisopropyl biphenyl is slightly more flammable than the polychlorinated biphenyls, isopropyl biphenyl fluid has a high resistivity too fire as can be seen from its OSHA classification of III-3 combustible fluid. This is the highest OSHA classification for fluids and is similar to mineral oil which was generally used as the predecessor to the polychlorinated biphenyl fluids. Although the auto-ignition temperature of isopropyl biphenyl fluids is over 400° C., it has occassionally caused capacitors internals to burn when the capacitor's containment casing ruptured and allowed the capacitor's internals to be completely expelled into the surrounding air.

Containment casing on capacitor units are typically metal whose joints are welded, brazed, or soldered. Such joints are the most vulnerable area on the capacitor casings to rupture due to increased gas pressure within the containment casing caused by internal arcing when the capacitor develops an internal fault. When the pressure exceeds the strength of the joint, the joint separates or ruptures and relieves the internal pressure. One approach for preventing the expulsion of the capacitor's internals and their subsequent ignition was to utilize a more strongly constructed containment casing by increasing the size of the joint's welds and/or the thickness of the containment casing. It was found that prevention of containment casing rupture required material and joint weld thicknesses so great as to be impractical. The most common rupture on capacitor units was found to be separation of the containment casing's bottom from the balance of the containment casing. A variety of bottom configurations were also tested in pursuit of a bottom to side weld joint which was stronger. For all attempts to make the capacitor units rupture-proof, it was found that the violence of the rupture increased as the strength of the joint increased, thus resulting in an undesirable design.

U.S. Pat. No. 3,600,636 which issued Aug. 17, 1971 and U.S. Pat. No. 3,634,798 which issued to Astleford on Jan. 11, 1972 and was assigned to the assignee of the present invention disclose bolts and rod-bracket assemblies respectively for supporting internal electrical assemblies from the cover of the surrounding electrical apparatus' structure. Such supporting devices are, however, unsuitable for containing parts from the supported electrical assembly within the structure. The previously mentioned supporting devices will retain the portions of the internal electrical assembly which remain intact and connected thereto, but will not retain those portions which are separated from the assembly during dissipation of the internal gas pressure through the rupture in the electrical apparatus' structure.

Valves and switches have also been the subject of experimentation in detecting pressure increases within the capacitor and relieving them or shutting down the capacitor prior to their buildup beyond the strength of the rupturable joint. Pressure relief valves or diaphragms and pressure switches were found to provide protection against case rupture only in low current tests when the pressure buildup from internal arcing was very slow. Additionally, the aforementioned monitoring and safety devices were judged undesirable due to their complexity and resulting malfunction susceptibility. In the worst case, such pressure relief valves can develop leaks that lead to capacitor degradation and failure. For such cases the pressure relief valves and other preventive systems would be considered a greater liability than an asset since auxiliary, safety devices such as these must be much more reliable than the device (capacitor in this case) that these systems are intended to protect.

SUMMARY OF THE INVENTION

In accordance with the present invention an improved power capacitor is provided for preventing fires in the event of a capacitor rupturing from an internal pressure buildup caused by electrical arcing from an internal capacitor fault. The invention generally comprises a containment casing having a base and an upper portion including a cover and side walls, an electrical assembly situated within the containment casing, and a cradle disposed within the containment casing for supporting the electrical assembly with the cradle being attached to the upper portion of the containment casing.

In a preferred embodiment of the invention the cradle is generally U-shaped, is attached to the side walls of the containment casing, and passes beneath the internal electrical assembly. In the event that the bottom of the capacitor containment casing ruptures, the cradle will restrain the electrical assembly generally in place within the containment casing preventing substantial contact with the outside air and oxygen. Such retention within the casing and isolation from oxygen retards burning of the electrical assembly.

BRIEF DESCRIPTION OF THE DRAWINGS

The invention will be more fully understood from the following detailed description of a preferred embodiment taken in connection with the accompanying drawings in which the sole FIGURE is a transverse sectional view of an exemplary capacitor in which the invention is incorporated.

DESCRIPTION OF THE PREFERRED EMBODIMENT

The present invention is concerned primarily with containment means for retaining a capacitor's internal electrical assembly within its containment casing.

The sole Figure illustrates the invention disposed in operating position within a power capacitor 10. Capacitor 10 is seen to have containment casing 12 which includes side walls 14 and cover 16 which together constitute an upper portion and a capacitor base 18 which constitutes a lower portion. Containment casing 12 usually has a rectangular cross section, but a cylinder or other suitably shaped casing could also be utilized for housing the capacitor's internals and the present invention. Disposed within the containment casing 12 is electrical assembly 20 which includes the electrical windings of the capacitor. A generally U-shaped cradle 22 is disposed within the containment casing 12 between the containment casing 12 and the electrical assembly 20. The illustrated capacitor 10 shows cradle 22 connected with the upper portion of the capacitor. It is to be understood that while cradle 22 is shown attached to side wall 14, cradle 22 could also be connected with capacitor cover 16. Either of the aforementioned structural members are suitable for attachment since the most likely structural member to fail is capacitor base 18 or weld securing it to sidewall 14. Sidewall 14 is seen to extend beyond base 18 with weld 19 being disposed therebetween in a fillet configuration within the resulting recess. Normal level 24 of impregnating fluid such as isopropyl biphenyl is such that it completely fills the capacitor. Bushings 26 are illustrated as attached to the cover 16 of the capacitor and being connected to the electrical assembly 20 through electrical leads 28. Bushings 26 provide two external electrical connections for capacitor 10, but it is to be understood that the present invention's use is not to be limited to use on capacitors having that number of external bushings.

In the event that an internal fault develops within the capacitor, internal gas pressure will become elevated as a result of internal arcing from the fault. It has been found that the most likely structural member to rupture when the capacitor is internally stressed by such internal gas pressure is the base 18 or the welds 19 connecting it to the side wall 14. When base 18 fractures or its welded joint 19 to side wall 14 ruptures, the impregnating fluid within containment casing 12 leaks out. Depending upon the severity of the rupture, electrical assembly 20 may tend to be expelled through a resultant opening. To prevent such explosion and possible subsequent fire, cradle 22 retains electrical assembly 20 within containment casing 12 isolating it from sufficient quantities of oxygen to support combustion. Upon occurrence of such capacitor failure, the unit can then be disconnected and repaired with minimum damage sustained and the possibility of fire eliminated.

It is to be understood that cradle 22 cooperates with the front and rear side walls for a four-sided casing (neither of which can be conveniently shown in the accompanying cross sectional drawing) to substantially form an enclosure within containment casing 12. It is to be further understood, however, that cradle 22 does not, in the preferred embodiment, tightly seal against the front and rear side walls and is, in fact, separated therefrom by a distance which is less than the width of winding 30 as its width would be measured into the page, perpendicular to the front and rear side walls of the capacitor. Such separation distance restriction is to prevent pressure build-up in the enclosure while retaining the capability of winding containment within the casing 12.

It will now be apparent that an improved capacitor structure has been provided in which the capacitor electrical internals are supported by an emergency cradle if, and when, the base of the capacitor is separated from the side walls. Such cradle while being simple to manufacture, has been shown to be highly effective in reducing capacitor blowout and fire resulting therefrom and has reliability superior to that of sophisticated capacitor monitoring equipment.

I claim:

1. A power capacitor apparatus with flammability risk avoidance comprising:

a containment casing having an upper portion including side walls and a cover and a lower portion including a base, said base being joined by a joint at its periphery to said side walls, said base and said joint being the parts of said casing which are susceptible to rupture when stressed by internal casing gas pressure induced by an internal fault;

an electrical assembly including a capacitor winding disposed within said casing;

bushings attached to said cover and connected by electrical leads to said electrical assembly;

a combustible, dielectric liquid filling said casing and impregnating said winding, said liquid occupying substantially the entire volume of said casing that is between said winding and said cover; and a cradle disposed within said casing for supporting said electrical assembly, said cradle comprising a generally U-shaped structure having a plurality of side members adjacent to and generally parallel with said side walls of said casing and a bottom member connected with said side members and located adjacent to and generally parallel with said base of said casing, said cradle being attached to said upper portion of said casing, said electrical assembly being retainable by said cradle upon rupture of either said casing's base or said joint to prevent substantial oxygen access to said fluid within said retained windings.

2. The power capacitor of claim 1 wherein said cradle's side and bottom members cooperate with said side walls and cover to form an unsealed housing which substantially encloses said electrical assembly within said containment casing.

3. The power capacitor of claim 2, wherein said cradle's side and bottom members are separated from at least one side wall by a distance less than said winding's dimension which is perpendicular to said separated side wall.

4. The power capacitor of claim 1 wherein said containment casing's base is recessed upwardly relative to the lower extremities of said side walls and is secured thereto by a fillet weld joint.

5. The power capacitor apparatus of claim 1 wherein said combustible dielectric liquid comprises isopropyl biphenyl.

* * * * *